United States Patent
Gleckler (10) Patent No.: US 9,308,839 B1
(45) Date of Patent: Apr. 12, 2016

(54) CHILD CAR SEAT TRANSPORTION SYSTEM

(71) Applicant: Michael Gleckler, Phoenix, AZ (US)

(72) Inventor: Michael Gleckler, Phoenix, AZ (US)

( * ) Notice: Subject to any disclaimer, the term of this patent is extended or adjusted under 35 U.S.C. 154(b) by 0 days.

(21) Appl. No.: 14/854,118

(22) Filed: Sep. 15, 2015

Related U.S. Application Data (63) Continuation-in-part of application No. 14/196,068, filed on Mar. 4, 2014, now abandoned.

(51) Int. Cl.
| | | |
|---|---|---|
| *B62B 7/02* | (2006.01) | |
| *B60N 2/28* | (2006.01) | |
| *B62B 7/00* | (2006.01) | |
| *B62B 9/20* | (2006.01) | |
| *B62B 7/12* | (2006.01) | |
| *B62B 7/14* | (2006.01) | |

(52) U.S. Cl.
CPC ............ *B60N 2/2848* (2013.01); *B60N 2/2821* (2013.01); *B60N 2/2845* (2013.01); *B62B 7/006* (2013.01); *B62B 7/02* (2013.01); *B62B 7/12* (2013.01); *B62B 7/145* (2013.01); *B62B 9/20* (2013.01)

(58) Field of Classification Search
CPC .. B60N 2/2848; B60N 2/2845; B60N 2/2827; B60N 2/2821; B60N 7/02; B60N 9/20; B62B 7/12; B62B 7/145
See application file for complete search history.

(56) References Cited

U.S. PATENT DOCUMENTS

| | | | | |
|---|---|---|---|---|
| 4,762,331 A | * | 8/1988 | Tucker ...................... | B62B 7/12 280/30 |
| 4,828,281 A | * | 5/1989 | Sanchas ............... | B60N 2/2848 280/250 |
| D358,058 S | | 5/1995 | Anthony | |
| 5,595,393 A | | 1/1997 | Batten | |
| 6,367,821 B2 | | 4/2002 | Thiele | |
| 6,986,518 B1 | * | 1/2006 | Besaw ................. | B60N 2/2812 280/30 |
| 7,540,507 B1 | * | 6/2009 | Kennedy .............. | B60N 2/2821 280/30 |
| 2002/0060444 A1 | * | 5/2002 | Cote .................... | B60N 2/2806 280/648 |
| 2004/0173997 A1 | * | 9/2004 | Voll ........................ | A47C 7/006 280/652 |
| 2004/0239079 A1 | * | 12/2004 | Bischoff .............. | B60N 2/2806 280/658 |
| 2007/0278756 A1 | * | 12/2007 | Erskine ................ | B60N 2/2806 280/47.25 |
| 2010/0019547 A1 | * | 1/2010 | Gray .................... | B60N 2/2821 297/118 |
| 2012/0119457 A1 | * | 5/2012 | Williams ............. | B60N 2/2821 280/30 |
| 2013/0154239 A1 | | 6/2013 | Longnecker | |

FOREIGN PATENT DOCUMENTS

JP  2554798  11/1996

* cited by examiner

*Primary Examiner* — Katy M Ebner
*Assistant Examiner* — Emma K Frick
(74) *Attorney, Agent, or Firm* — Kyle A. Fletcher, Esq.

(57) ABSTRACT

The mobile seat assembly for transporting a user includes a seat that may support a first user. A wheel is operationally coupled to the seat. The wheel may to roll along a support surface. A first handle is operationally coupled to the seat. The first handle may be gripped so the seat may be carried. A second handle is operationally coupled to the seat. The first handle may be gripped so the seat may be rolled along the support surface.

13 Claims, 8 Drawing Sheets

CHILD CAR SEAT TRANSPORTION SYSTEM

CROSS REFERENCES TO RELATED APPLICATIONS

This non-provisional patent application is a continuation-in-part application that claims priority to non-provisional patent application Ser. No. 14/196,068, which was filed on Mar. 4, 2014.

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of child car seats, more specifically, child car seat transportation systems.

SUMMARY OF THE INVENTION

An embodiment of the disclosure meets the needs presented above by generally comprising a seat that may support a first user. A wheel is operationally coupled to the seat. The wheel may to roll along a support surface. A first handle is operationally coupled to the seat. The first handle may be gripped so the seat may be carried. A second handle is operationally coupled to the seat. The first handle may be gripped so the seat may be rolled along the support surface.

An object of the invention is to provide a device that is child car seat transportation system.

These together with additional objects, features and advantages of the child car seat transportation system will be readily apparent to those of ordinary skill in the art upon reading the following detailed description of presently preferred, but nonetheless illustrative, embodiments of the child car seat transportation system when taken in conjunction with the accompanying drawings.

In this respect, before explaining the current embodiments of the child car seat transportation system in detail, it is to be understood that the child car seat transportation system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the child car seat transportation system.

It is therefore important that the claims be regarded as including such equivalent construction insofar as they do not depart from the spirit and scope of the child car seat transportation system. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
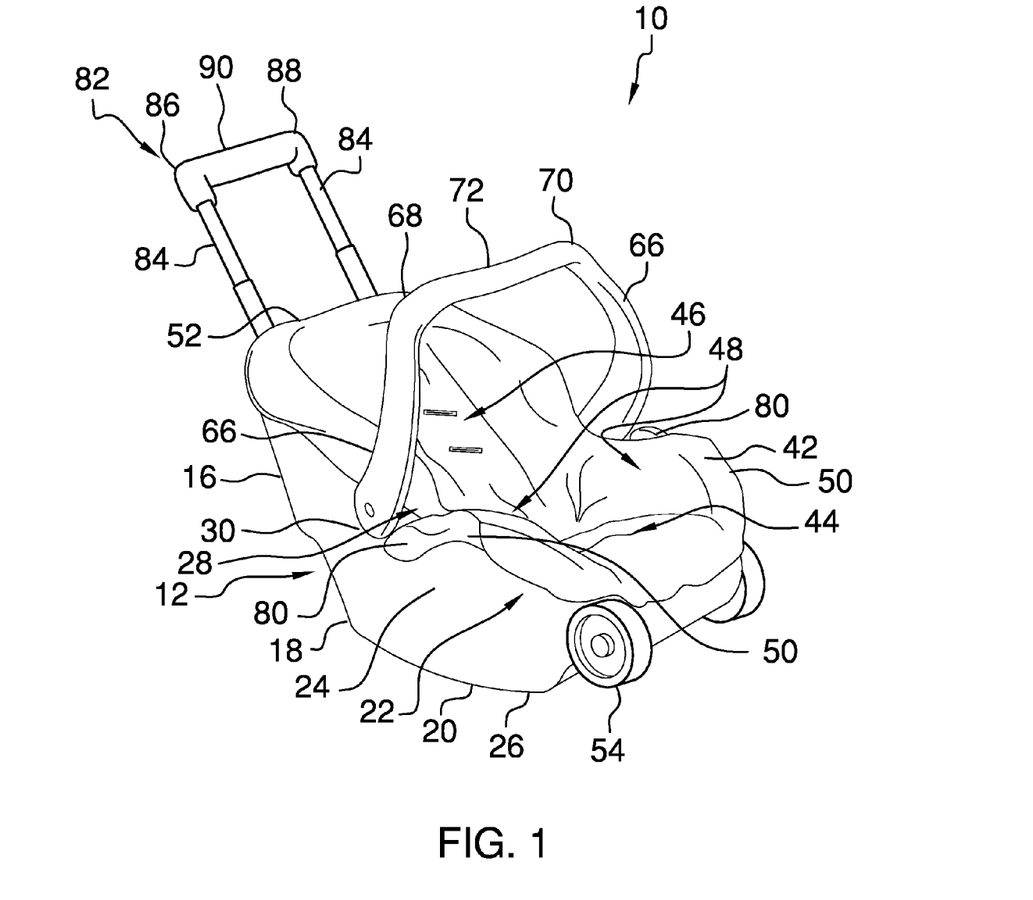
FIG. 1 is a perspective view of a mobile seat assembly according to an embodiment of the disclosure.
Figure 2:
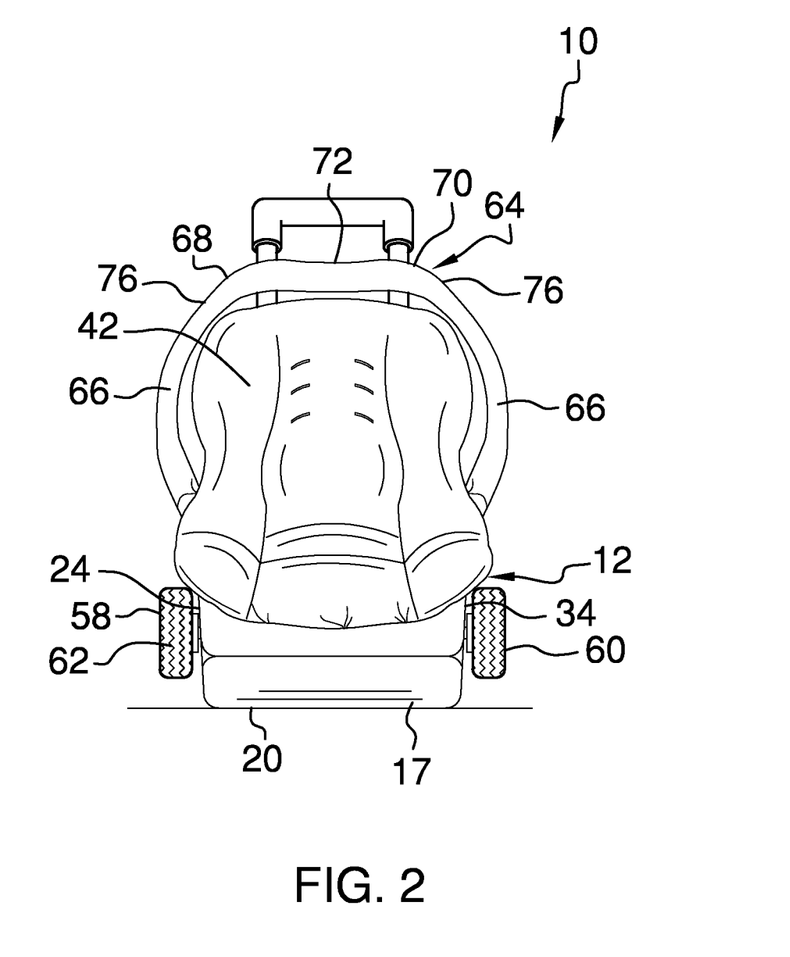
FIG. 2 is a front view of an embodiment of the disclosure.
Figure 3:
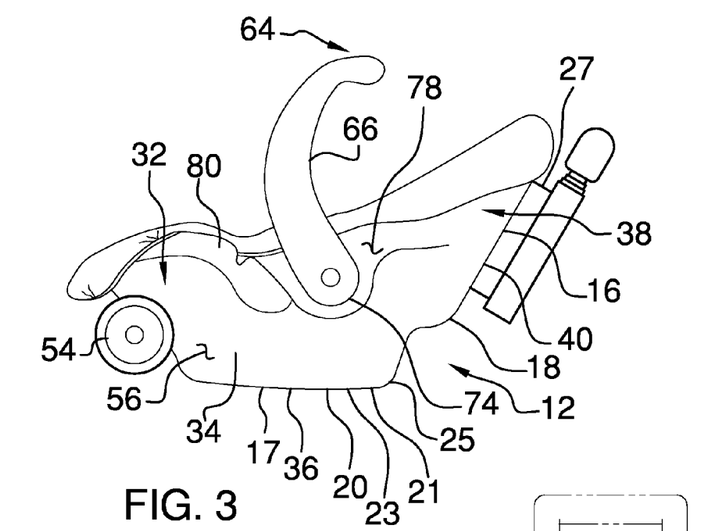
FIG. 3 is a left side view of an embodiment of the disclosure.
Figure 4:
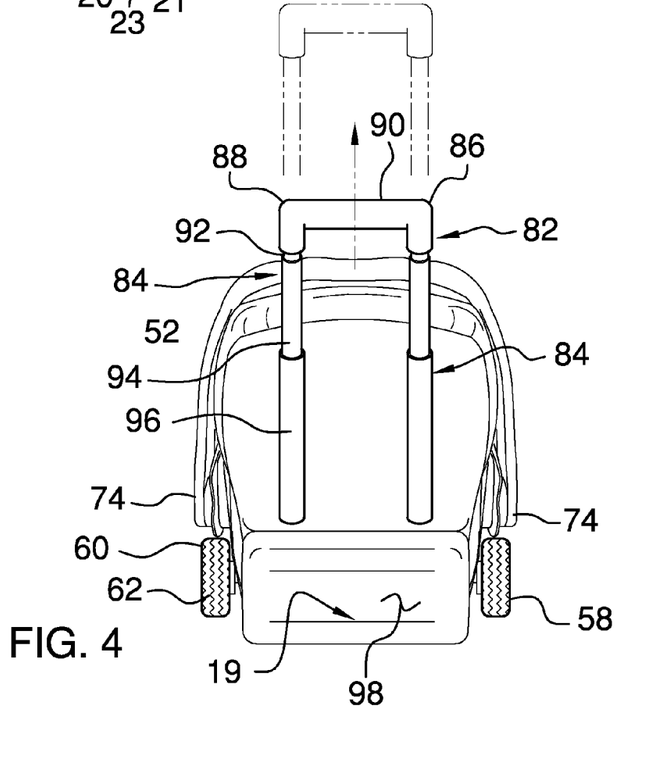
FIG. 4 is a back view of an embodiment of the disclosure.
Figure 5:
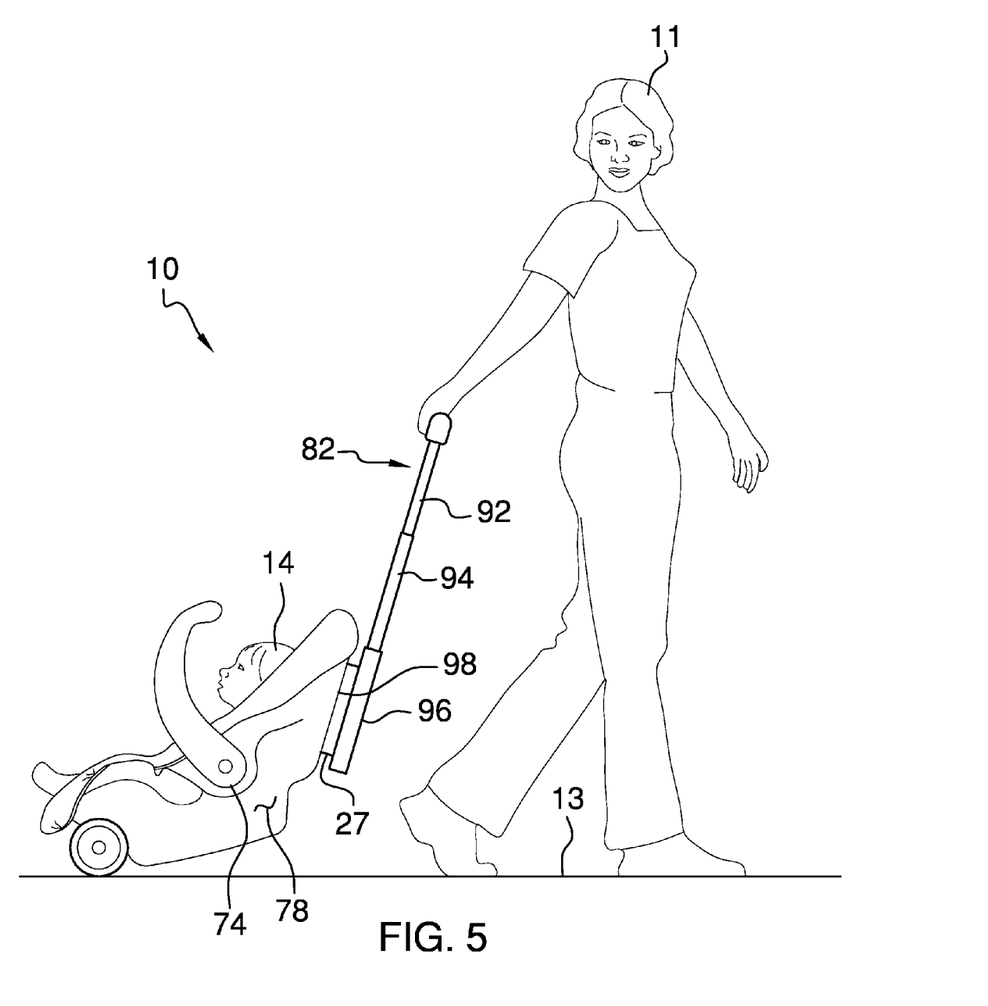
FIG. 5 is an in-use view of an embodiment of the disclosure.
Figure 6:
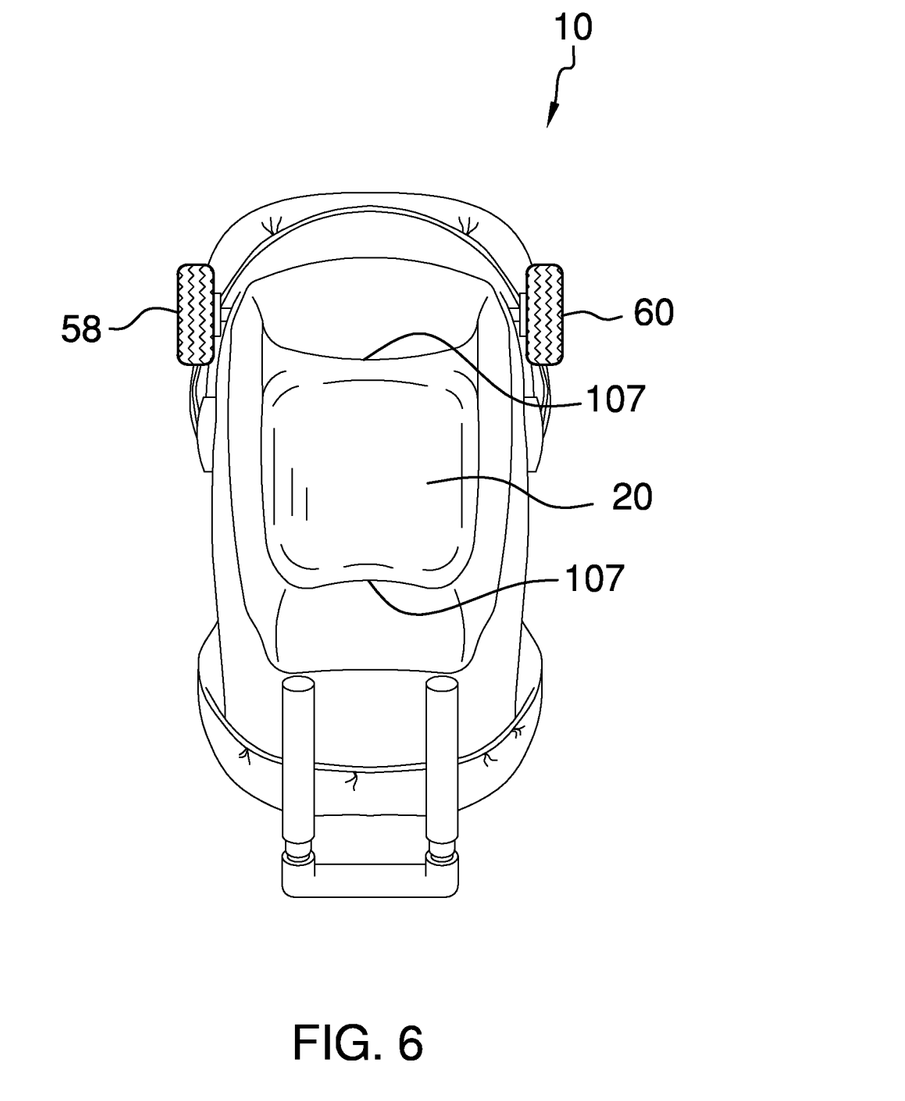
FIG. 6 is a bottom view of an embodiment of the disclosure.
Figure 7:
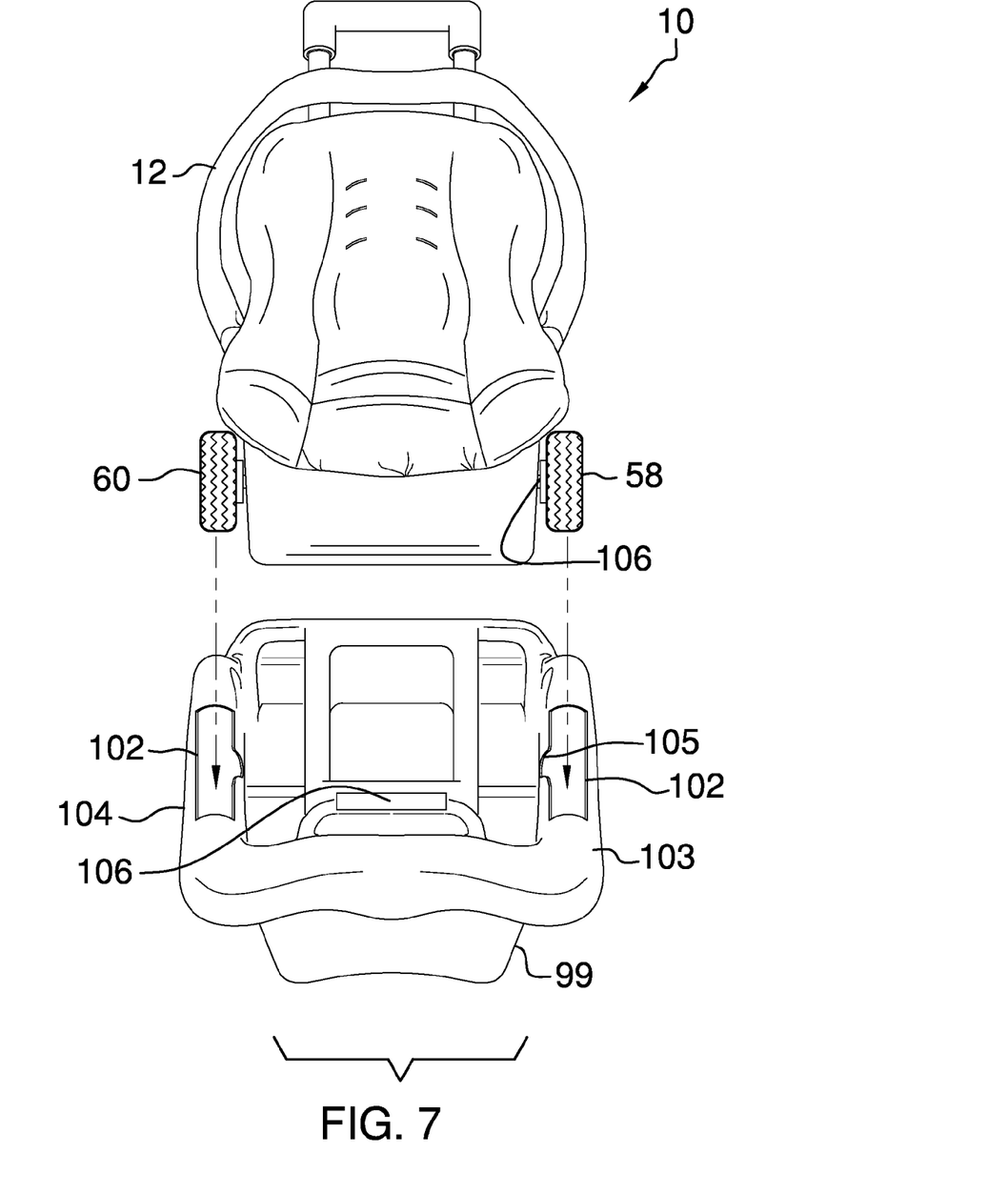
FIG. 7 is a front, exploded view of an embodiment of the disclosure.
Figure 8:
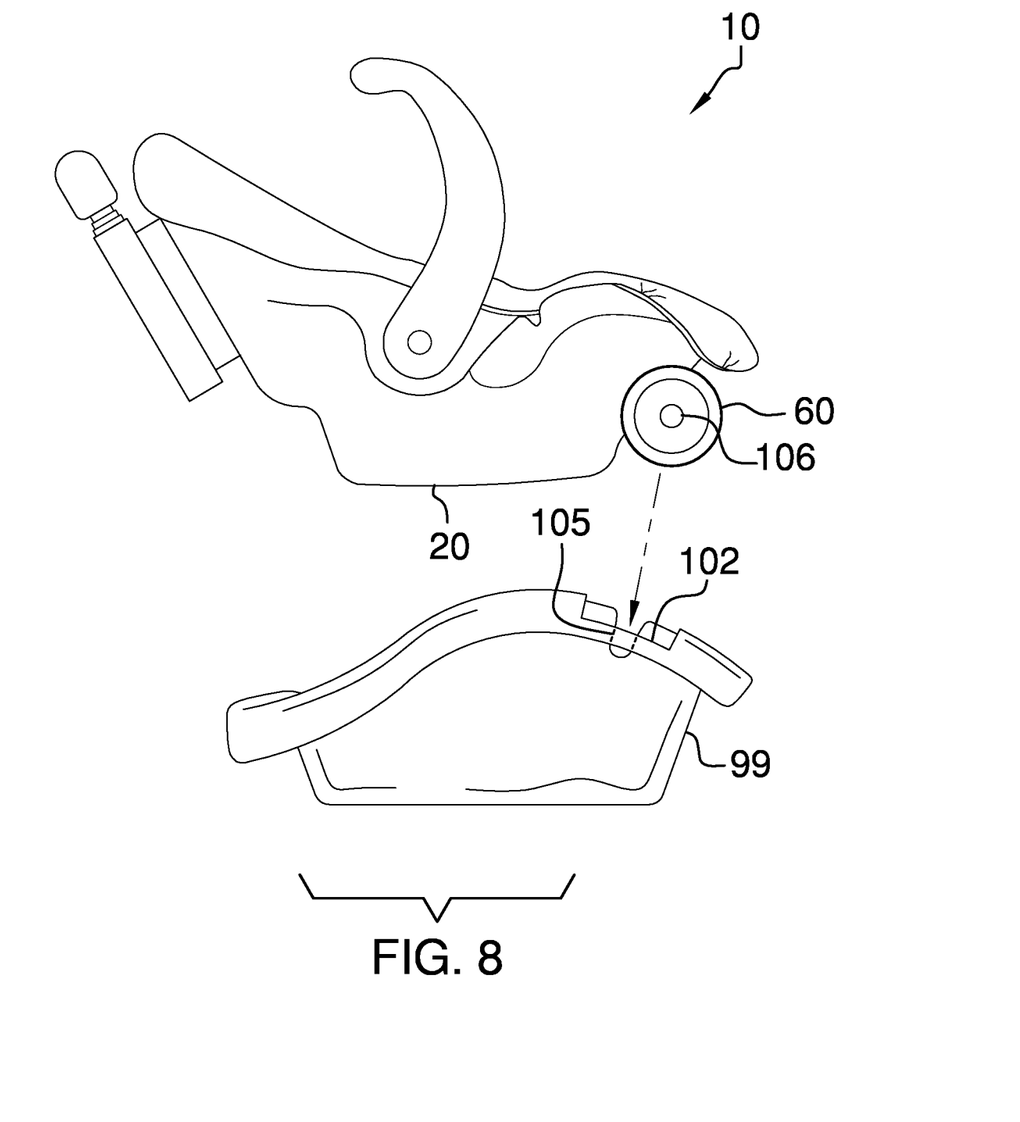
FIG. 8 is a side, exploded view of an embodiment of the disclosure.
Figure 9:
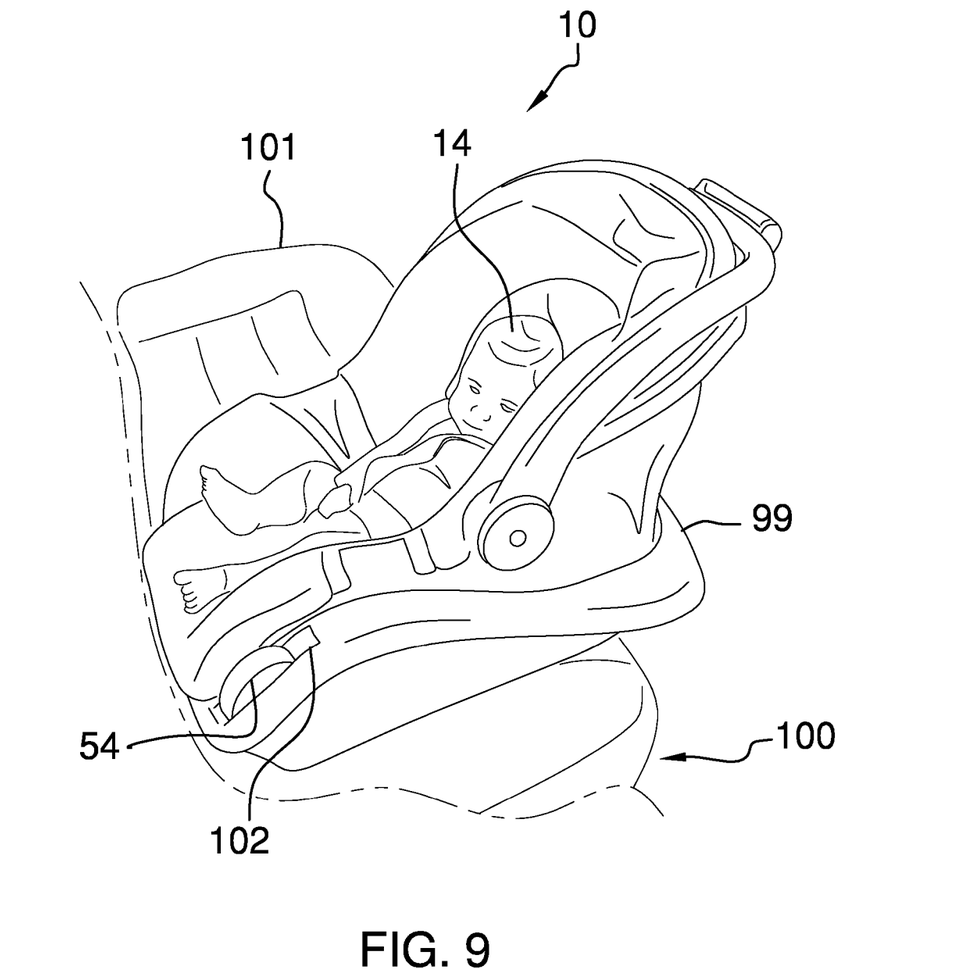
FIG. 9 is a perspective view of an embodiment of the disclosure in use.

As best illustrated in FIGS. 1 through 9, the mobile seat assembly 10 generally comprises a seat 12 that support a first user 14. The seat 12 may be a children's car seat of any conventional design. Moreover, the first user 14 may be a child. A back side 16 of the seat 12 extends upwardly from a rear edge 18 of a bottom side 20 of the seat 12. The back side 16 of the seat 12 may have a height and a width between 25 cm and 35 cm. Further, the bottom side 20 of the seat 12 may have a length 20 cm and 25 cm and a width between 25 cm and 35 cm.

A lower portion 22 of a first lateral side 24 of the seat 12 extends upwardly from a first lateral edge 26 of the bottom side 20 of the seat 12. Continuing, an upper portion 28 of the first lateral side 24 of the seat 12 extends forwardly from a first lateral edge 30 of the back side 16 of the seat 12. The lower portion 22 of the first lateral side 24 of the seat 12 may have a height between 10 cm and 12 cm and a width between 12 cm and 18 cm. Lastly, the upper portion 28 of the first lateral side 24 of the seat 12 may have a height between 15 cm and 25 cm and a width between 10 cm and 12 cm.

A lower portion 32 of a second lateral side 34 of the seat 12 extends upwardly from a second lateral edge 36 of the bottom side 20 of the seat 12. Additionally, an upper portion 38 of the second lateral side 34 of the seat 12 extends forwardly from a second lateral edge 40 of the back side 16 of the seat 12. The lower portion 32 of the second lateral side 34 of the seat 12 may have a height between 10 cm and 12 cm and a width between 12 cm and 18 cm. Lastly, the upper portion 38 of the second lateral side 34 of the seat 12 may have a height between 15 cm and 25 cm and a width between 10 cm and 12 cm.

A cushion 42 is coupled to the seat 12. The cushion 42 covers a top side 44 of the bottom side 20 of the seat 12 and a front side 46 of the back side 16 of the seat 12. Further, the cushion 42 covers an inside surface 48 of each of each of the first 24 and second 34 lateral sides of the seat 12. The cushion 42 extends around an outer edge 50 of the lower portions 22, 32 of each of the first 24 and second 34 lateral sides of the seat 12. Further, the cushion 42 extends around a top edge 52 of the back side 16 of the seat 12. Lastly, the first user 14 rests on the cushion 42 when the first user 14 is placed in the seat 12.

A wheel 54 is rotatably coupled to an outside surface 56 of the seat 12. The wheel 54 is one of a pair of the wheels 54. A first one of the pair of wheels 58 is positioned proximate an intersection of the first lateral side 24 of the seat 12 and the bottom side 20 of the seat 12. Additionally, a second one of the pair of wheels 60 is positioned proximate an intersection of the second lateral side 34 of the seat 12 and the bottom side 20 of the seat 12. An outer surface 62 of the first 58 and second 60 wheels may comprise a resiliently compressible material such as rubber or other similar material.

A first handle 64 is provided. Continuing, a pair of vertical arms 66 of the first handle 64 extend downwardly from an associated one of a first end 68 and a second end 70 of a horizontal arm 72 of the first handle 64. The pair of vertical arms 66 of the first handle 64 may each have a length between 25 cm and 30 cm. Moreover, the horizontal arm 72 of the first handle 64 may have a length between 15 cm and 20 cm.

Each of the pair of vertical arms 66 of the first handle 64 curves inwardly between a bottom end 74 of the pair of vertical arms 66 of the first handle 64 and a top end 76 of each of the pair of vertical arms 66 of the first handle 64. Moreover, each of the pair of vertical arms 66 of the first handle 64 curves rearwardly between the bottom end 74 of each of the pair of vertical arms 66 of the first handle 64 and the top end 76 of each of the pair of vertical arms 66 of the first handle 64. The bottom end 74 of each of the pair of vertical arms 66 of the first handle 64 is rotatably coupled to an outer surface 78 of the upper portions 28, 38 of an associated one of the first 24 and second 34 lateral sides of the seat 12. Lastly, the first handle 64 may be gripped so the seat 12 may be carried.

A rear section 80 of the outer edge 50 of the lower portions 22, 32 of each of the first 24 and second 34 lateral sides of the seat 12 extends rearwardly toward the upper portions 28, 38 of each of the first 24 and second 34 lateral sides of the seat 12. The rear section 80 of the outer edge 50 of the lower portions 22, 32 of the first 24 and second 34 lateral sides of the seat 12 are not covered by the cushion 42. Further, the rear section 80 of the outer edge 50 of the lower portions 22, 32 of each of the first 24 and second 34 lateral sides of the seat 12 curves downwardly.

A second handle 82 is provided. Continuing, a pair of vertical arms 84 of the second handle 82 extend downwardly from an associated one of a first end 86 and a second end 88 of a horizontal arm 90 of the second handle 82. A top portion 92 of each of the pair of vertical arms 84 of the second handle 82 is slidably coupled to a middle portion 94 of each of the pair of vertical arms 84 of the second handle 82. The middle portion 94 of each of the pair of vertical arms 84 of the second handle 82 is slidably coupled to a bottom portion 96 of each of the pair of vertical arms 84 of the second handle 82. Moreover, the second handle 82 has a telescopically adjustable height that may range between 15 cm and 60 cm.

A pair of couplers 27 each extends forwardly from the bottom portion 96 of an associated one of the pair of vertical arms 84 of the second handle 82. The pair of couplers 27 may each have a length between 10 cm and 12 cm. Additionally, the pair of couplers 27 is each coupled to an outer surface 98 of the back side 16 of the seat 12 so the second handle 82 is retained on the seat 12.

The second handle 82 is positionable in a deployed position so the horizontal arm 90 of the second handle 82 is vertically spaced from the seat 12. Moreover, the horizontal arm 90 of the second handle 82 may be positioned at a selected point between a minimum height of the second handle 82 and a maximum height of the second handle 82. The second handle 82 is positionable in a stored position so the horizontal arm 90 of the second handle 82 is positioned proximate the seat 12. The horizontal arm 90 of the second handle 82 may be gripped when the second handle 92 is positioned in the deployed position. A second user 11 rolls the seat 12 along a support surface 13. The second user 11 may be an adult.

In use, the first user 14 is positioned within the seat 12. The second handle 82 is positioned in the deployed position when the second user 11 wishes to transport the first user 14 in the seat 12. Continuing, the second user 11 raises the bottom side 21 off of the support surface 13. The second user 11 pushes the seat 12 along the support surface 13 to transport the first user 14 in the seat 12.

The bottom side 20 of the seat 12 is able to be nested within a car seat dock 99. The car sear dock 99 is adapted to be secured to a vehicle seat 101 in order to secure the seat 12 in a vehicle 100. The car seat dock 99 features wheel openings 102 that accommodate the pair of wheels 54. Moreover, the car seat dock 99 is further defined with a left armature 103 and a right armature 104. Both the left armature 103 and the right armature 104 include one of the wheel openings 102. The first one of the pair of wheels 58 is able to partially nest within one of the wheel openings 102 of the left armature 103. The second one of the pair of wheels 60 is able to partially nest within one of the wheel openings 102 of the right armature 104. The wheel openings 102 are further defined with an elongated groove 105 that extends downwardly and which accommodates a wheel axle 106 of each of the pair of wheels 54.

The bottom side 20 of the seat 12 includes locking contours 107 that work in concert with a locking member 108 integrated into the car seat dock 99. The locking member 108 is spring-loaded, and is used to lock or unlock the seat 12 from the car seat dock 99. In use, the car seat dock 99 secures the seat 12 to the vehicle seat 101 in order to transport the first user 14 via the vehicle 100.

With respect to the above description, it is to be realized that the optimum dimensional relationship for the various components of the mobile seat assembly 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the mobile seat assembly 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A mobile seat assembly for transporting a user, said assembly comprising:

a seat configured to support a first user;
a wheel operationally coupled to said seat;
wherein said wheel is configured to roll along a support surface;
a first handle operationally coupled to said seat;
wherein said first handle is configured to be gripped when the seat is carried;
a second handle operationally coupled to said seat;
wherein said second handle is configured to be gripped where the seat is rolled along the support surface;
a car seat dock adapted to secure to a vehicle seat of a vehicle;
wherein seat is selectively positioned on the car seat dock in order to adaptively transport said first user via said vehicle;
wherein said wheel is one of a pair of said wheels;
wherein a first one of said pair of wheels is positioned proximate an intersection of a first lateral side of said seat and a bottom side of said seat;
wherein a second one of said pair of wheels is positioned proximate an intersection of a second lateral side of said seat and the bottom side of said seat;
wherein the bottom side of the seat is able to be nested within the car seat dock;
wherein the car seat dock includes wheel openings that accommodate the pair of wheels;
wherein the car seat dock is further defined with a left armature and a right armature; wherein both the left armature and the right armature include one of the wheel openings; wherein the first one of the pair of wheels is able to partially nest within one of the wheel openings of the left armature; wherein the second one of the pair of wheels is able to partially nest within one of the wheel openings of the right armature;
wherein the wheel openings are further defined with an elongated groove that extends downwardly and which accommodates a wheel axle of each of the pair of wheels.

2. The assembly according to claim 1 wherein a back side of said seat extends upwardly from a rear edge of the bottom side of said seat.

3. The assembly according to claim 1 wherein:
a lower portion of the first lateral side of said seat extends upwardly from a first lateral edge of the bottom side of said seat;
an upper portion of the first lateral side of said seat extends forwardly from a first lateral edge of a back side of said seat.

4. The assembly according to claim 1 wherein:
a lower portion of the second lateral side of said seat extends upwardly from a second lateral edge of the bottom side of said seat; and
an upper portion of the second lateral side of said seat extends forwardly from a second lateral edge of a back side of said seat.

5. The assembly according to claim 1 wherein said wheel is rotatably coupled to an outside surface of said seat.

6. The assembly according to claim 1 wherein said first handle comprises a pair of vertical arms of said handle that extends downwardly from an associated one of a first end and a second end of a horizontal arm of said first handle.

7. The assembly according to claim 1 wherein:
each of a pair of vertical arms of said first handle curves inwardly between a bottom end of said pair of vertical arms of said first handle and a top end of each of said pair of vertical arms of said first handle; and
each of said pair of vertical arms of said first handle curves rearwardly between said bottom end of each of said pair of vertical arms of said first handle and said top end of each of said pair of vertical arms of said first handle.

8. The assembly according to claim 1 wherein a bottom end of each of a pair of vertical arms of said first handle is rotatably coupled to an upper portion of an associated one of the first lateral side and the second lateral side of said seat.

9. The assembly according to claim 1 wherein said second handle comprises a pair of vertical arms of said second handle that extends downwardly from an associated one of a first end and a second end of a horizontal arm of said second handle.

10. The assembly according to claim 1 wherein:
a top portion of each of a pair of vertical arms of said second handle is slidably coupled to a middle portion of each of said pair of vertical arms of said second handle;
said middle portion of each of said pair of vertical arms of said second handle is slidably coupled to a bottom portion of each of said pair of vertical arms of said second handle;
wherein said second handle has a telescopically adjustable height;
a coupler extends forwardly from said bottom portion of each of said vertical arms of said second handle; and
said coupler is coupled to a back side of said seat;
wherein said second handle is retained on said seat.

11. The assembly according to claim 1 wherein:
said second handle is positionable in a deployed position;
wherein a horizontal arm of said second handle is vertically spaced from said seat;
said second handle is positionable in a stored position;
wherein said horizontal arm of said second handle is positioned proximate said seat.

12. The assembly according to claim 1 wherein a horizontal arm of said second handle is gripped where said second handle is positioned in a deployed position; wherein the user adaptively rolls said seat along the support surface.

13. The assembly according to claim 1 wherein the bottom side of the seat includes locking contours that work in concert with a locking member integrated into the car seat dock; wherein the locking member is spring-loaded, and is used to lock or unlock the seat from the car seat dock.

* * * * *